United States Patent [19]
Cole

[11] 4,008,913
[45] Feb. 22, 1977

[54] TOOL FOR MAKING WHIP FINISHING KNOT

[76] Inventor: Lorin Charles Cole, 6052 Montgomery Bend, San Jose, Calif. 95135

[22] Filed: Oct. 9, 1975

[21] Appl. No.: 621,012

[52] U.S. Cl. .............................................. 289/17
[51] Int. Cl.² ......................................... D03J 3/00
[58] Field of Search ...................... 289/17, 1.5, 18; 242/7.01, 7.19; 140/127; 43/4

[56] References Cited
UNITED STATES PATENTS

| | | | |
|---|---|---|---|
| 2,220,878 | 11/1940 | Harvey | 242/7.19 |
| 2,332,655 | 10/1943 | Miles | 242/7.19 |
| 2,609,155 | 9/1952 | Fosnaugh | 242/7.19 |
| 3,520,566 | 7/1970 | Bovigny | 289/17 |
| 3,866,959 | 2/1975 | Matarelli | 289/17 |
| 3,877,736 | 4/1975 | Zauskey | 289/17 |

Primary Examiner—Louis K. Rimrodt
Attorney, Agent, or Firm—Owen, Wickersham & Erickson

[57] ABSTRACT

A tool for use by a fly tyer to provide a whip finishing knot comprises an elongated handle with an axially extending first slender element having a first hook formed at its free end; a substantially straight intermediate portion extending transverse to the longitudinal axis of the handle and terminating in a second hook that is spaced at right angle of the first hook.

5 Claims, 15 Drawing Figures

U.S. Patent  Feb. 22, 1977  Sheet 1 of 2  4,008,913
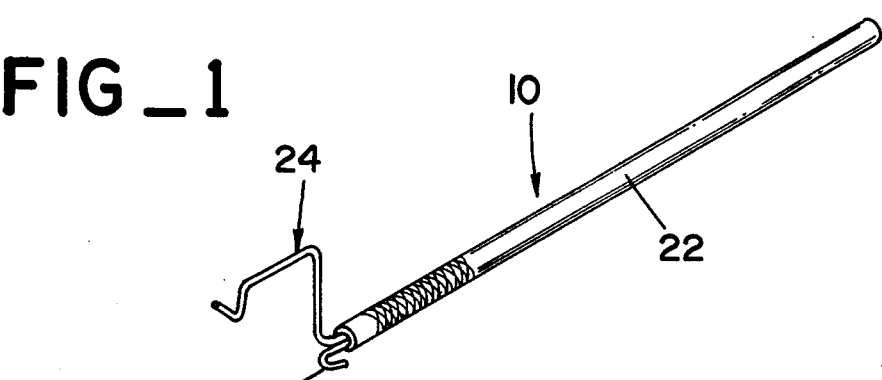
FIG_1
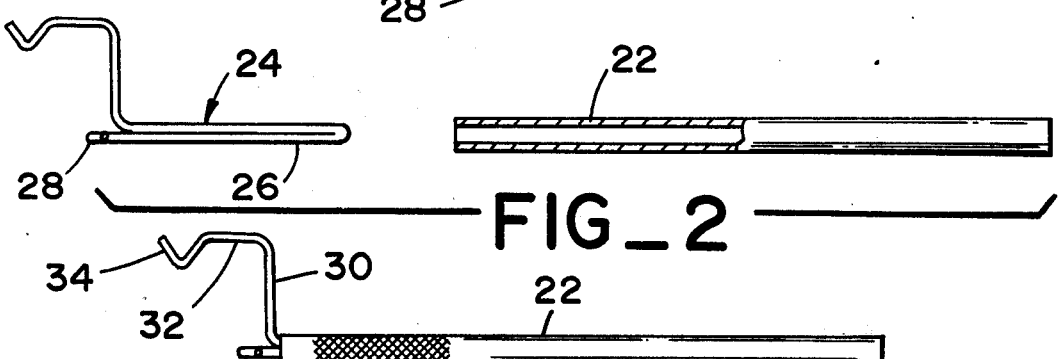
FIG_2
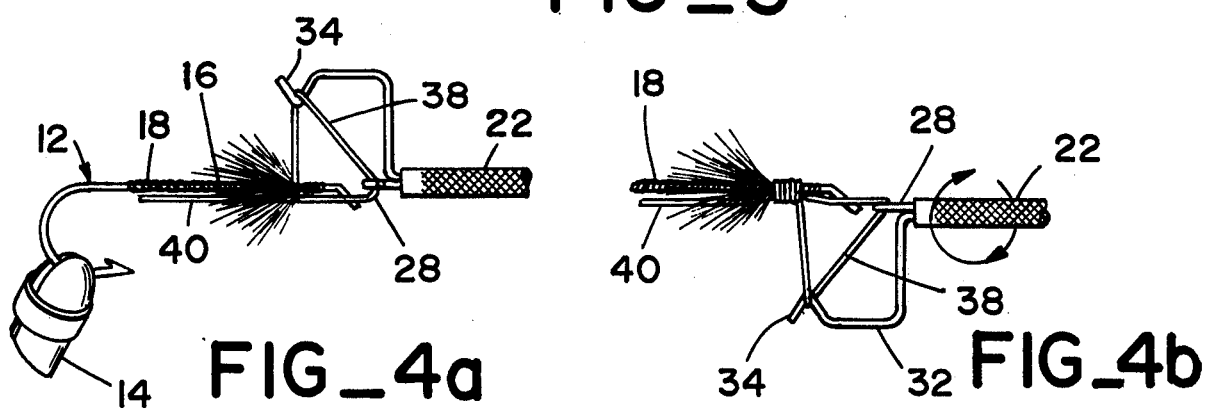
FIG_3
FIG_4a
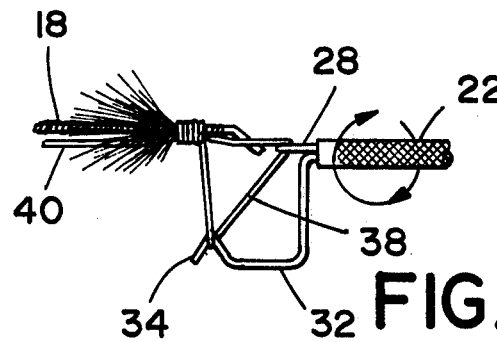
FIG_4b
FIG_4c
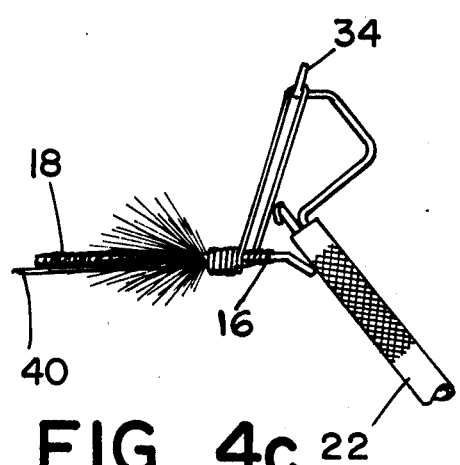
FIG_4c
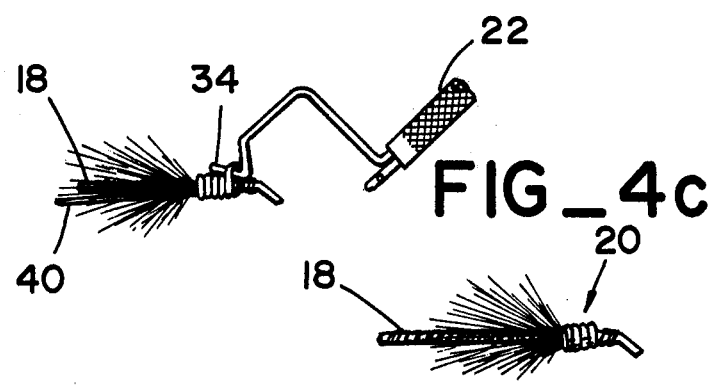
FIG_5

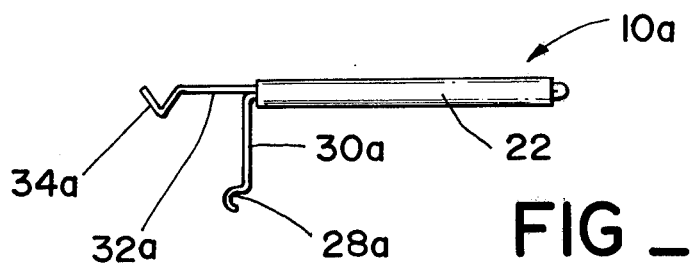
FIG_6
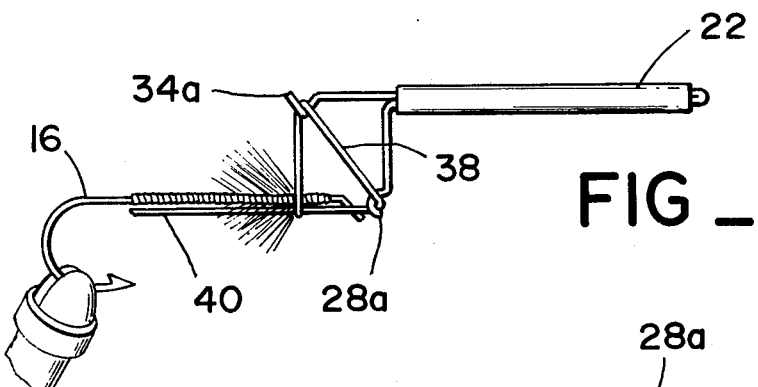
FIG_7a
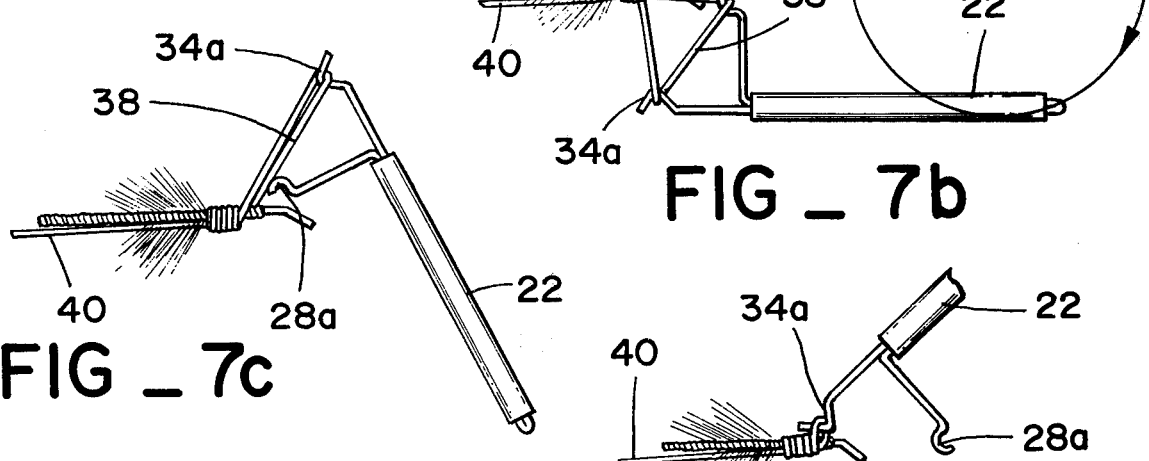
FIG_7b
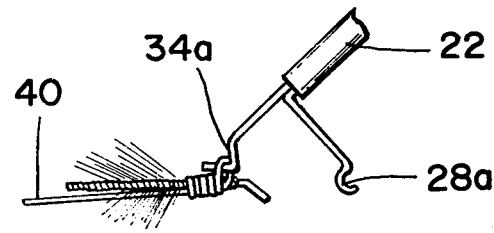
FIG_7d
FIG_7c
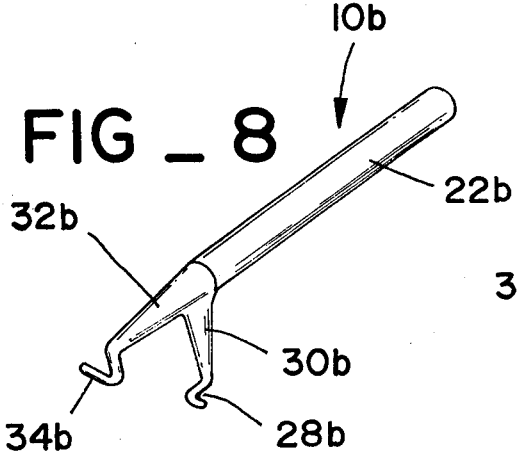
FIG_8
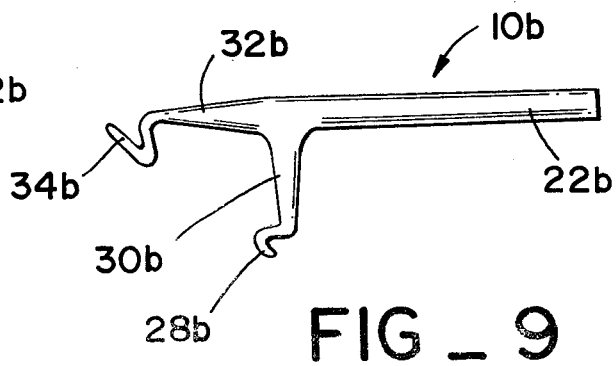
FIG_9

TOOL FOR MAKING WHIP FINISHING KNOT

BACKGROUND OF THE INVENTION

This invention relates to an improved tool for use in tying artificial fishing flies, and more specifically for securing the tying thread to the hook shank by what is well known as a whip finishing knot.

Although fly tiers have long used the whip finishing knot, its application, for all but the more highly skilled and dexterious user, was often extremely difficult. Various tools were divised in attempts to solve the problem, a recent example of which is U.S. Pat. No. 3,877,736. However, such prior art tools failed to produce satisfactory results. One primary disadvantage was that they were difficult or impossible to manipulate through an entire knot tying procedure without having the thread inadvertently disengage from the tool at some point. This was particularly a problem with such tools when tying flies on relatively small hooks. In another prior art tool disclosed in U.S. Pat. No. 3,866,959 an attempt was made to solve the problem by forming the whip finishing knot in two stages, that is, by removing the tool from the tying thread during the knot tying procedure and using it subsequently to manipulate a loop of the knot. However, this procedure proved to be cumbersome, time consuming and generally unsatisfactory.

It is therefore an object of the present invention to provide an improved whip finishing tool for fly tiers that will enable a whip finishing knot to be made rapidly with a continuous sequence of steps wherein the thread does not become disengaged from the tool until the knot is complete.

Another object of the present invention is to provide a whip finishing tool that is particularly useful in tying a whip finishing knot on relatively small hooks, as well as the larger ones.

Yet another object of the present invention is to provide a whip finishing tool that is particularly well adapted for ease and economy of manufacture.

BRIEF SUMMARY OF THE INVENTION

The aforesaid and other objects are accomplished by a whip finishing tool comprising an elongated handle that is easily held and manipulated by the fly tier. Aligned with the axis of the handle and extending from one end thereof is a slender member having a first holding hook portion for engaging the thread being used on the fly being tied. Extending outwardly at any angle from the slender member with the first hook portion is another slender member that terminates at a second tying hook. In use, the two hooks of the tool engage the thread to form and retain a thread loop so that when the tool is held near the hook shank the outer tying hook holds the thread essentially perpendicular to the hook shank, thereby enabling the thread to be wrapped around it as the tool is easily rotated. Release of the thread from both hooks is accomplished just as the knot is completed. Other objects, advantages and features of the invention will become apparent from the following detailed description presented in conjunction with the accompanying drawing.

BRIEF DESCRIPTION OF THE DRAWINGS

FIG. 1 is a view in perspective of a whip finishing tool embodying principles of the present invention;

FIG. 2 is an exploded view of the tool of FIG. 1;

FIG. 3 is a side view in elevation of my tool;

FIGS. 4a – 4d, inclusive, show sequential steps in forming a knot with the tool of FIG. 1 according to the present invention;

FIG. 5 is a fragmentary view of a fishing fly with a completed whip finishing knot;

FIG. 6 is a side view in elevation of a modified form of my whip finishing tool;

FIGS. 7a – 7d, inclusive, show sequential steps in forming a knot with the tool of FIG. 6;

FIG. 8 is a view in perspective of a one piece tool embodying principles of the present invention; and FIG. 9 is a view in side elevation of the tool of FIG. 8.

DETAILED DESCRIPTION OF EMBODIMENTS

With reference to the drawing, FIGS. 1 – 3 show a tool 10, according to the present invention, which is adapted for tying a whip finishing knot on an artificial fishing fly. Normally, as a fly is being made, a suitable hook 12, as shown in FIGS. 4a, is held firmly in a vice 14 so that the lure or fly tying material can be applied to the hook shank 16 by means of a thread 18 which is ultimately secured by a whip finishing knot 20 (See FIG. 5).

The tool 10 comprises an elongated tubular handle 22 made of a suitable plastic or metal such as steel or aluminum. Firmly secured in one end of the handle and extending therefrom is a thread engaging element 24 made of a suitable stiff material of uniform diameter. Preferably, the element 24 is made of a single piece of wire that is bent to form a double end portion 26 which is retained within the handle. One of the legs of the double end portion 26 of the element 24 extends axially from the handle and terminates with a first holding hook member 28. The latter is bent in a plane which roughly passes through the axis of the handle, and the open part of the hook member 28 faces generally towards the other end of the handle.

The other leg of the double end portion 26 of the element 24 projects from the handle and immediately forms a segment 30 that extends at approximately a right angle to the plane of the first hook member 28 for a short distance (e.g. around 0.75 inches). The segment 30 then is bent to form a segment 32 which extends for approximately the same length or even somewhat longer than the segment 30 (e.g. around 0.875 inches) and is parallel to the axis of the handle 22. The segment 32 terminates with a generally V or U-shaped end portion 34 that is essentially a tying hook member formed in the same plane as the segments 30 and 32.

The operation and advantages of the device 10 in actual use for forming a whip finishing knot are readily understandable with reference to FIGS. 4a – 4d. In FIGS. 4a, the hook is shown held in a fly-tying vice 14 with the hook shank 16 extending generally horizontal. The fishing fly has been essentially formed with its various lure materials held to the hook shank by the fly tying thread 18 supplied from a suitable spool. Now, to complete the fly, the whip finishing knot must be made near the eye of the hook.

It should be noted that the hook size shown for illustrative purposes is exaggerated and unusually large. In actual practice, hooks for many flies may range down to a much smaller size that the one shown. For example, a size 12 hook which is one common hook size is around ½ inch in length. For even smaller sizes, down to a size 28 hook, which are often used by many fly fisherman, the overall hook length may be only 3/16 inch. With this in mind, the importance of my tool 10 will become even more apparent.

Now, with the hook held as in FIG. 4a, the element 24 of the tool engages the thread 36 with the second or outer tying hook portion 34 holding a loop 38 of thread that extends at right angles from the thread holding the fly materials to the hook shank. From the second or outer hook portion, the thread loop 38 extends to the first holding hook member 28 of the tool and then is held so that end portion 40 of the thread extends parallel to the hook shank. Note that in this beginning step for forming a whip finishing knot with the tool 10, the tool handle 22 is essentially axially aligned with the axis of the hook shank. This is important because it affords the tool user a high degree of control in manipulating the tool to form a neat and secure knot.

With the tool initially held as in FIG. 4a, the user now rotates the tool handle about its longitudinal axis, as shown in FIG. 4b, to rotate the loop 30 and coil the thread around the hook shank 16 and also the end portion 40 of thread lying along the hook shank with as many turns as desired. As these turns are made, the supply of thread is released as required so that the thread can slide easily through the hook portions of the tool.

Now, turning to FIG. 4c, when the desired number of turns are formed on the hook shank near the eye of the hook, the tool is pivoted downwardly so that the first or inner hook portion 28 is released from the loop 38 while the outer hook portion 34 still retains the loop. In the final step shown in FIG. 4d, the free or supply end of the thread is pulled away from the tool as the outer hook portion of the tool is lowered toward the coils of thread on the hook shank causing the loop to gradually disappear. As the tool nears the hook shank, the thread is removed from the outer hook portion as the coils of thread are tightened by pulling the thread end portion 40 along the hook shank, and the whip finishing knot is completed. Thus, as seen from the foregoing description, the tool 10 does not become disengaged from the thread and, in fact, easily retains it until the desired knot is formed. In this manner, effective whip finishing knots 20 (as shown in FIG. 5), with as many turns as desired, can be formed quickly and easily on even extremely small hooks.

Although, as described, the tool 10 is used with a convenient twisting action, as shown in FIG. 4b, many fly tyers prefer to use a cranking action that circles around the shank of the fish hook when wrapping the thread on the hook. Such a cranking action can be more easily obtained with a modified form of my invention by changing the position of the said elongated handle 22 relative to the hooks 34 and 28, as shown by the tool 10a in FIG. 6. In this alternate embodiment, an elongated element 32a is aligned with and projects outwardly from a handle 22a (e.g. around ⅞ inch) and terminates in a V or U-shaped hook portion 34a. Another slender element 30a is bent at right angles from the end of the handle, extending to around ¾ inch and terminating in another open hook 28a. Thus, it is seen that the relative orientation of the hooks 28a and 34a is the same as the hooks 28 and 34 of the tool 10, except that on the tool 10, the outermost hook 34 is offset from the handle axis, while on the tool 10a the outermost hook 34a is essentially aligned with the handle axis.

Now, with the tool 10b held as in FIG. 7a, the tying thread is engaged by the outer tying hook portion 34a and the inner offset hook portion 28a, holding a loop 38 of thread that extends at right angles from the hook shank. From the outer hook portion 34a, the thread loop 38 extends to the inner hook member 28a of the tool and then is held so that end portion 40 of the thread extends parallel to the hook shank. Note that in this beginning step for forming a whip finishing knot with the tool 10a, the hook 28a is essentially axially aligned with the axis of the hook shank. For fly-tyers that prefer the cranking action, this is important because it affords the tool user a high degree of control in manipulating it to form a neat and secure knot.

With the tool initially held as in FIG. 7a, the user now cranks the entire tool about the axis of the hook 28a (with its handle axis describing a circular motion, as shown in FIG. 7b) thereby rotating the loop 38 and winding the thread around the hook shank 16 and also the end portion 40 of thread lying along it with a desired number of turns. As these turns are made, the supply of thread is released as required so that the thread can slide easily through the hook portions of the tool. When sufficient turns have been made, the inner hook 28a may be released, as shown in FIG. 7c. Thereafter, the end of the thread 40 may be pulled tight while the hook 34a retains the thread loop until it is pulled near the hook shank. When this occurs the outer hook 34a can be easily released as the finished knot is tightened in place (See FIG. 7d).

Although the tools 10 and 10a, as described, may be conveniently formed from metallic materials, it may be described to utilize a suitable plastic material such as nylon to mold a one-piece tool 10c, as shown in FIGS. 8 and 9. This form of my tool includes an elongated handle 22b with a first integral extended portion 32b which tapers from the end of the handle and terminates at an outer hook portion 34b. Extending at a right angle to the handle axis near its end is a second integral member 30b that also tapers and terminates at a hook portion 28b. Again, the hook portions 28b and 34b have the same relative orientation as the hook portions 28b and 34b of the tool 10a, and preferably they are curved or bent in generally opposite directions but in the same plane so that the tool is easily molded as a single unit. The tool 10b has the advantage of being producible in large numbers at relatively low unit cost, possibly even lower than the embodiments 10 and 10a. Its use and manipulation is identical to that of tool 10a, as previously described.

To those skilled in the art to which this invention relates, further changes in construction and widely differing embodiments and applications of the invention will suggest themselves without departing from the spirit and scope of the invention. The disclosures and the description herein are purely illustrative and are not intended to be in any sense limiting.

I claim:

1. A fly-tiers tool adapted for forming a whip finishing knot with a thread tied to a fish hook having a shank terminating at an eye portion, said tool comprising:
    an elongated handle;
    a thread engaging element attached to the end of said handle and having a first portion terminating in a first hook shaped end member spaced axially outwardly from the end of said handle, and a second portion terminating in a second hook shaped end member spaced axially closer to the end of said handle than said first end member, one of said hook shaped end members being substantially aligned with the longitudinal axis of said handle and the other said end member being offset from the longitudinal axis of said handle;

whereby said hook shaped end members are together adapted to retain a loop of the thread so that it can be rotated around the hook shank near its eye portion as an end portion of the thread is held parallel to the hook shank, and so that the loop can be retained until being released as the thread is drawn tight to form the whip finishing knot.

2. The tool as described in claim 1 wherein said element is formed of wire bent to form said first portion extending outwardly away from and then parallel to said double axis and terminating with said first hook member and said second portion terminating with said second hook member near the end of said handle.

3. The tool as described in claim 1 wherein said handle is tubular and said element is formed of wire bent to form said first portion that extends axially from one end of said handle and terminates with said first hook shaped member and said second portion that extends at substantially a right angle to said handle axis from its said one end and terminates with said second hook shaped member.

4. The tool as described in claim 1 wherein said first elongated portion of said thread engaging element is substantially aligned with the longitudinal axis of said handle and said second portion of said element extends substantially at a right angle to the handle axis, said handle and said thread engaging element including its said portions and said hook shaped elements being formed as one integral piece from plastic material.

5. The tool as described in claim 4 wherein said hook shaped elements are bent or curved in substantially the same plane.

* * * * *